March 19, 1940.　　　J. R. ADAMS　　　2,194,158
AUTOMATIC CONTROL FOR MOVIE CAMERAS
Filed Feb. 26, 1938　　　2 Sheets-Sheet 1
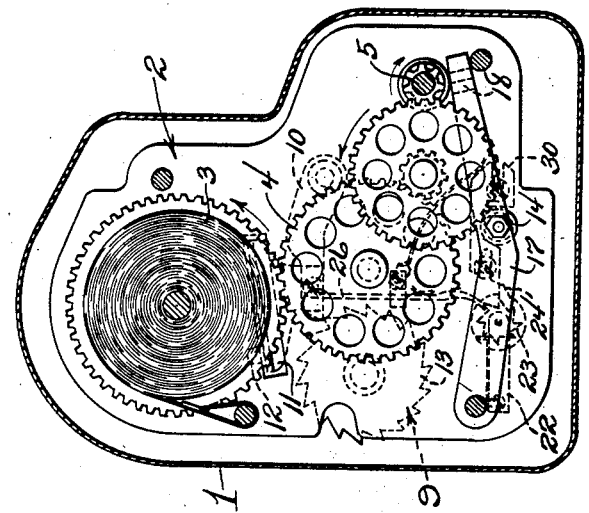
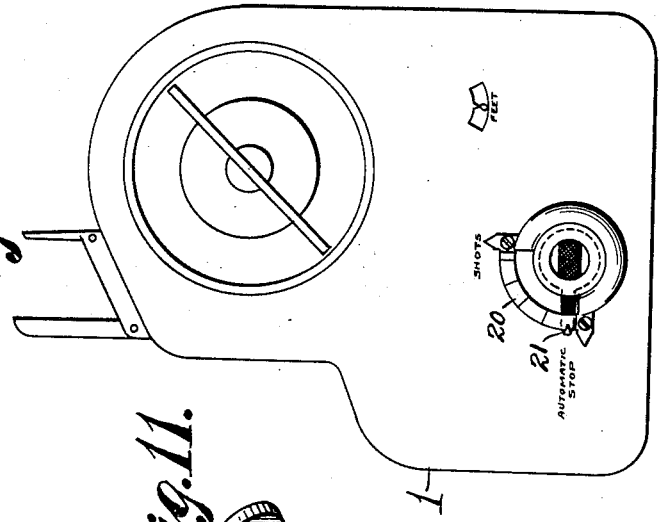
James R. Adams
INVENTOR
BY Victor J. Evans & Co.
ATTORNEYS March 19, 1940. J. R. ADAMS 2,194,158
AUTOMATIC CONTROL FOR MOVIE CAMERAS
Filed Feb. 26, 1938 2 Sheets-Sheet 2

James R. Adams
INVENTOR

BY *Victor J. Evans & Co.*
ATTORNEYS

Patented Mar. 19, 1940

2,194,158

UNITED STATES PATENT OFFICE 2,194,158

AUTOMATIC CONTROL FOR MOVIE CAMERAS

James Robert Adams, Vancouver, British Columbia, Canada

Application February 26, 1938, Serial No. 192,851

1 Claim. (Cl. 88—18)

This invention relates to controls for drive mechanisms of movie cameras and has for the primary object the provision of a device of this character which will assure the camera shutter occupying a closed position when the drive mechanism is stopped either automatically or manually.

Another object of this invention is the provision of a control which may be readily adjusted for stopping the drive mechanism automatically after a predetermined operation of the camera or for permitting starting and stopping of the drive mechanism to be entirely manually controlled.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a drive mechanism for a movie camera and equipped with my invention.

Figure 2 is a vertical sectional view illustrating the same.

Figure 10 is a perspective view showing a latch forming a part of the present invention.

Figure 11 is a perspective view illustrating a ratchet gear forming a part of the mechanism disclosed in Figure 5 and equipped with a lug for the actuation of the latch disclosed in Figure 10.

Figure 12 is a plan view illustrating a pointer employed in the present invention.

Figure 4:
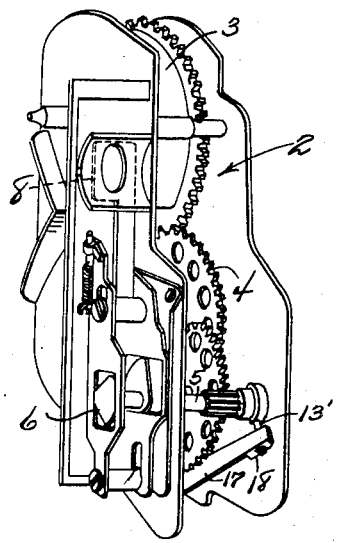
Figure 4 is a perspective view showing the drive mechanism and the shutter and its operating means actuated by the drive mechanism.
Figure 3:
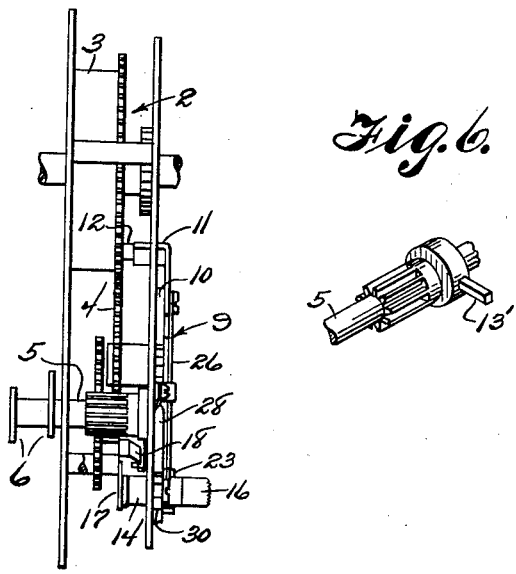
Figure 3 is an edge elevation showing the drive mechanism and its arbor and my invention adapted thereto.
Figure 6:
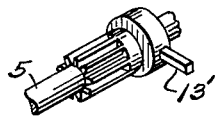
Figure 6 is a fragmentary perspective view showing the shaft forming a part of the drive mechanism and shutter operating means equipped with a lug forming a part of the present invention.
Figure 5:
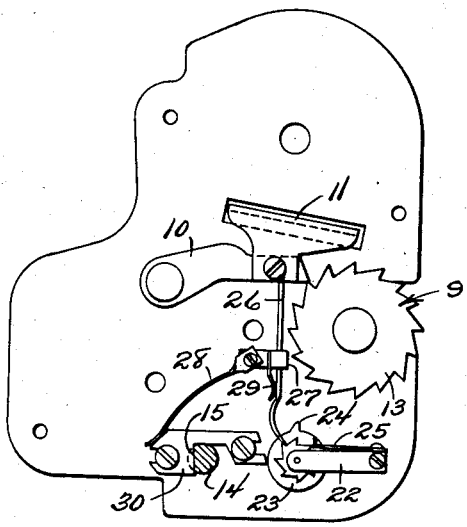
Figure 5 is a side elevation, partly in section, showing one of the walls of the arbor and a portion of the mechanism for indicating the length of the film exposed with a portion of my invention connected thereto.
Figure 7:
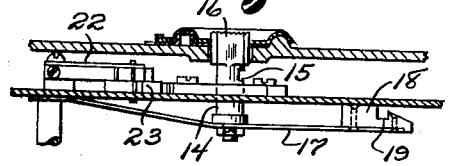
Figure 7 is a top plan view partly in section showing a portion of the control.
Figure 8:
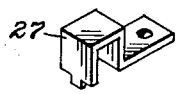
Figure 8 is a perspective view showing the guide bracket forming a part of the present invention.
Figure 9:
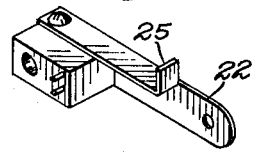
Figure 9 is a perspective view illustrating a journal forming a part of the mechanism shown in Figure 5 employed for indicating the amount of film exposed.

Referring in detail to the drawings, the numeral 1 indicates a casing of a movie camera, 2 a drive mechanism for the actuation of the camera consisting of a spring motor 3, a train of gears 4 and a shaft 5 forming a part of a shutter operating means 6 of the camera, the shutter being indicated by the character 8. The drive mechanism also includes a mechanism indicated generally by the character 9 for showing through the casing the amount of exposed film in feet. The construction described is well known in the movie camera art and the present invention is adapted thereto for the manual and automatic control of the camera or its drive mechanism. The mechanism 9 referred to operates in a step by step movement and includes a pivoted dog 10 carrying a strike plate 11 engaged by a pin 12 forming a part of the spring motor so that each time the pin 12 on its respective gear makes a complete revolution, movement is imparted to the pivoted dog 10 and that in turn through a ratchet gear 13 brings about the step by step movement of the film indicating mechanism. These parts also are conventional in a movie camera construction and to which my invention is connected.

In adapting the present invention to the construction described a lug 13' is secured to the shaft for rotation therewith and slidably mounted in the arbor and extending through the casing is a stud 14 having a notch 15 and a finger piece 16 secured on its outer end. The stud 14 carries a spring arm 17 on which is mounted a keeper 18 notched, as shown at 19. The stud 14 is capable of two positions one moved inwardly with respect to the casing of the camera and the other moved outwardly. The stud also is capable of rotation by the finger piece in the arbor. The stud is manually rotated and slid into its different positions through the use of the finger piece arranged outwardly of the camera casing, as shown in Figure 1. The camera casing carries a scale 20 over which a pointer 21 secured on the stud 14 moves and applied on the camera casing adjacent the scale are characters to indicate the different phases of operation of the control such as automatic stop and shots. One revolution of the shaft 5 completes opening and closing of the shutter 8 and when the shutter is in a closed position the lug 13' is so positioned that it will enter the notch 19 of the keeper 18 when the stud 14 is in one of its positions. The spring arm 17 is mounted on the stud 14 so that the latter may be rotated without effecting movement of the spring arm, the latter is suitably secured at one end on the arbor. However, the position of the spring arm may be varied by the endwise movements of the stud and when said stud is moved endwise in one position the keeper 18 is in the path of movement of the lug 13' and when the stud is slid endwise into a second position the keeper 18 is out of the path of movement of the lug 13'. To permit a single operation of the shutter, that is, an opening and closing of the shutter the stud is pressed inwardly and released. The inward movement of the stud disengages the keeper 18 of the lug 13', permitting the spring motor to drive the shaft 5 for said opening and closing of the shutter and as the lug 13' again engages with the keeper the spring motor is stopped with the shutter in closed position, consequently assuring that the shutter will occupy a closed position whenever the spring motor stops.

A bracket or journal 22 is secured on the arbor and rotatably supports a ratchet gear 23 including a lug 24. A spring 25 is carried by the journal to engage with the ratchet gear 23 to prevent reverse rotation thereof. An arm in the form of a dog 26 is pivoted on the arm 10 and is slidably supported by a bracket 27 mounted on the arbor and which also forms supports for springs 28 and 29. The dog 26 engages with the ratchet gear 23 to impart movement thereto by the pivotal movement of the arm or dog 10. The arm or dog 10 being intermittently operated by the spring motor through the dog 26 will impart a step by step movement to the ratchet gear 23 and the lug 24 thereof. The spring 29 acts on the dog 26 to yieldably support the latter in engagement with the ratchet gear 23. Slidably mounted on the arbor is a latch 30 which is normally urged in a direction by the spring 28 in the path of movement of the lug 24 and into the notch 15 of the stud 14 when the latter is positioned with the notch 15 thereof in the path of movement of the latch 30. In order that the latch 30 enter the notch 15 the stud must be positioned to move the keeper 18 out of the path of movement of the lug 13'. The lug 24 when engaging the latch 30 will impart sliding movement thereto for moving the same out of the lug 13' of the notch 15 and permit the same to move into latching position, that is, positioning of the keeper 18 in the path of movement of the lug 13'. A determined amount of film will be exposed during one complete revolution of the lug 24 and if the latch 30 is acting to retain the control stud 14 in a position for the release of the lug 13' the camera will be driven by the spring motor for a predetermined time or such time that the lug 24 operates the latch 30 and frees the control stud 14 to permit its movement into position for stopping the spring motor when the lug 13' engages the keeper 18 and which assures the stopping of the operation of the camera with the shutter in closed position.

In operation, when it is desired to photograph objects and scenes with this camera in what is termed as shots, the finger piece 16 is rotated to position the indicator 21 opposite the word "shots." The rotation of the finger piece as described moves the notch 15 of the control stud into a position which will prevent the latch 30 from entering said notch thereby holding the latch out of the path of movement of the lug 24. The operator then presses the finger piece, moving the control stud 14 endwise flexing the spring arm 17 to disengage the keeper 18 from the lug 13'. The manual pressure on the finger piece is then released and the control stud returns to its initial position under the influence of the spring arm repositioning the keeper in the path of movement of the lug 13'. However, as the lug 13' is freed from the keeper the shaft 5 is rotated one complete revolution by the spring motor which brings about an opening and closing of the shutter. The opening and closing of the shutter exposes a portion of the film to the object or scene. The shaft 5 on completing its revolution is stopped by the lug 13' engaging the notch of the keeper, bringing about stopping of the spring motor with the shutter in a closed position. To permit the camera to operate for a selected period of time in taking pictures of objects or scenes and to automatically stop the taking of pictures of scenes at the expiration of a determined period of time the control stud 14 is rotated and moved endwise by the finger piece 16 to bring the notch 15 in the path of movement of the latch 30. The latch 30 being spring influenced moves into the notch 15 and also into the path of movement of the lug 24. The endwise movement of the control stud brings about the release of the lug 13' permitting the spring motor to operate and the latter continues to operate until the lug 24 engages the latch 30 and moves the same out of the notch 15 freeing the control stud to return to its normal position and the repositioning of the keeper 18 to be engaged by the lug 13'. When the control stud is moved endwise and rotated as last described the indicator 21 moves into a position opposite the words "automatic stop", consequently permitting the operator to determine when the control stud has been properly adjusted for the taking of pictures for a selected period of time automatically and the automatic stopping of the taking of the pictures at the expiration of the predetermined length of time.

What is claimed is:

In combination with a movie camera having a drive mechanism for operating shutter and film mechanisms of said camera and including a rotatable shutter operating shaft, a lug carried by said shaft, a spring arm mounted on the camera and normally occupying a position in the path of movement of the lug for stopping the drive mechanism with the shutter of the shutter mechanism in a closed position, a control element slidably and rotatably mounted on the camera and rotatably connected with the spring arm and capable of flexing said arm when manually slid endwise out of the path of movement of the lug, said element having a notch, an indicator carried by said element for showing the positions occupied thereby, a slidable spring pressed latch carried by the camera to engage in said notch when the control element is rotated and moved endwise into one of its positions for freeing the lug, and means driven by the drive mechanism for automatically operating the latch to free said control element for the stopping of said drive mechanism after the expiration of a predetermined period of operation of said camera.

JAMES ROBERT ADAMS.